United States Patent
Wolleschensky et al.

(10) Patent No.: US 7,561,338 B2
(45) Date of Patent: Jul. 14, 2009

(54) MICROSCOPE OBJECTIVE SYSTEM

(75) Inventors: Ralf Wolleschensky, Jena (DE); Hans-Jürgen Dobschal, Kleinromstedl (DE); Robert Brunner, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 115 days.

(21) Appl. No.: 11/459,146

(22) Filed: Jul. 21, 2006

(65) Prior Publication Data

US 2007/0058262 A1 Mar. 15, 2007

(30) Foreign Application Priority Data

Jul. 22, 2005 (DE) ........................ 10 2005 034 442

(51) Int. Cl.
*G02B 21/02* (2006.01)
*G02B 21/06* (2006.01)

(52) U.S. Cl. ........................ 359/656; 359/389

(58) Field of Classification Search ................ 359/368, 359/385, 389, 656–661

See application file for complete search history.

(56) References Cited

U.S. PATENT DOCUMENTS

| | | | |
|---|---|---|---|
| 3,743,377 A | 7/1973 | Rosenberger | |
| 4,155,622 A | 5/1979 | Klein | |
| 5,103,341 A | 4/1992 | Ulrich et al. | |
| 5,153,873 A * | 10/1992 | Spruit et al. | 369/275.2 |
| 6,023,381 A | 2/2000 | Bender | |
| 6,122,046 A | 9/2000 | Almogy | |
| 6,181,478 B1 * | 1/2001 | Mandella | 359/642 |
| 6,226,118 B1 | 5/2001 | Koyama et al. | |
| 7,259,924 B2 | 8/2007 | Wahl et al. | |
| 7,372,545 B2 | 5/2008 | Emer | |
| 2003/0044967 A1 | 3/2003 | Heffelfinger et al. | |
| 2004/0101210 A1 | 5/2004 | Weinstein et al. | |
| 2004/0165257 A1 | 8/2004 | Shafer et al. | |
| 2004/0240078 A1 | 12/2004 | Sekiyama | |
| 2005/0231700 A1 | 10/2005 | Emer | |
| 2007/0139763 A1 | 6/2007 | Wolleschensky et al. | |

FOREIGN PATENT DOCUMENTS

| | | |
|---|---|---|
| DE | 2 225 479 | 7/1973 |
| DE | 39 15 868 A1 | 5/1989 |
| DE | 198 04 470 C1 | 8/1999 |
| DE | 199 01 219 A1 | 9/1999 |
| DE | 199 59 228 A1 | 6/2001 |
| DE | 103 03 812 A1 | 8/2004 |
| DE | 10 2004 035 595 A1 | 11/2005 |

OTHER PUBLICATIONS

"Visual Microscopic Analysis with a Diamond ATR Infrared Objective," Sensir Technologies, Application Brief AB-056.
Z. Bor, "Distortion of femtosecond laser pulses in lenses," Optics Letters, vol. 14, No. 2, pp. 119-121 (Jan. 15, 1989).

* cited by examiner

*Primary Examiner*—William C Choi
(74) *Attorney, Agent, or Firm*—Patterson, Thuente, Skaar & Christensen, P.A.

(57) ABSTRACT

A microscope objective system including an objective, which includes an illumination beam path via which illumination radiation from a source is directed onto an object to be examined, as well as a partial detection beam path surrounding at least part of the illumination beam path and, together with the illumination beam path, forms a detection beam path via which radiation to be detected and coming from the sample is guided towards a detector.

19 Claims, 3 Drawing Sheets

MICROSCOPE OBJECTIVE SYSTEM

RELATED APPLICATION

The current application claims the benefit of priority to German Patent Application No. 10 2005 034 442.9 filed on Jul. 22, 2005. Said application is incorporated by reference herein.

FIELD OF THE INVENTION

The invention relates to a microscope objective system comprising an objective, which system is used, for example, in fluorescence microscopy, in particular in 2-photon microscopy.

BACKGROUND OF THE INVENTION

A very high light gathering efficiency of the microscope objective system is of decisive importance for experiments in fluorescence microscopy. In particular in the case of very weak fluorescence signals, such as those which occur, for example, in 2-photon experiments, the fluorescent light therefore has to be gathered from a solid angle range which is as large as possible. In known microscope objective systems comprising an objective, a high gathering efficiency is achieved by a great numerical aperture, although this requires a very small working distance (distance between the objective and the sample). However, in many cases a great working distance is desired, in particular if the samples have to be manipulated during the experiment.

Therefore, it is an object of the present invention to provide a microscope objective system comprising an objective, which has a very high gathering efficiency and at the same time allows a great working distance.

SUMMARY OF THE INVENTION

According to the invention, the object is achieved by a microscope objective system comprising an objective, which has an illumination beam path via which illumination radiation is directed onto an object to be examined, as well as a partial detection beam path which surrounds at least part of the illumination beam path and, together with the illumination beam path, forms a detection beam path via which radiation to be detected and coming from the sample is guided towards a detector.

Since the detection beam path is composed of the illumination beam path and the partial detection beam path which surrounds at least part of the illumination beam path, the gathering efficiency can be increased due to the additional partial detection beam path. At the same time, the illumination beam path may be provided such that the desired working distance is achieved, although the gathering efficiency is increased due to the partial detection beam path. Thus, the partial detection beam path serves exclusively to gather the radiation to be detected. In contrast thereto, the illumination beam path serves, on the one hand, to illuminate the sample to be examined with illumination radiation and also to gather and transmit the radiation to be detected which enters the illumination beam path.

The partial detection beam path may begin at the objective's end facing toward the sample. In particular, the partial detection beam path may extend along the illumination beam path and, in doing so, may continuously pass into the illumination beam path.

The illumination beam path may have a first etendue and the detection beam path may have a second etendue greater than the first etendue. The first etendue is understood herein to be the product of the sample's surface to be illuminated and the numerical aperture of the illumination beam path. Likewise, the second etendue is understood to be the product of the sample's surface to be detected and the numerical aperture of the detection beam path. For example, assuming that the surface to be illuminated and the surface to be detected is the same surface, thus having the same size, it is readily apparent that the numerical aperture of the detection beam path is greater than the numerical aperture of the illumination beam path. Due to the larger numerical aperture of the detection beam path, a higher gathering efficiency is achieved as compared to an objective in which the radiation to be detected is gathered only via the illumination beam path. In order to achieve this greater gathering efficiency, however, the working distance of the object from the sample to be examined need not be reduced, because the higher numerical aperture is present only at the detection beam path, and not at the illumination beam path.

Further, in the microscope objective system according to the invention, a core aperture can be assigned to the illumination beam path of the objective and a ring aperture surrounding the core aperture can be assigned to the partial detection beam path.

Thus, a greater solid angle range (core aperture+ring aperture) is used for detection than for directing radiation from the source onto the object (core aperture). This makes it possible to provide the illumination beam path with a moderate core aperture of, for example, NA=0.8, in an optically highly corrected manner, and at the same time to have a great working distance. In contrast thereto, the outer ring aperture exclusively serves to gather detection radiation. For this purpose, it is sufficient to guide the detection radiation which is gathered from the solid angle range of the ring aperture towards the detector. The imaging performance of the detection beam path in the vicinity of the ring aperture is not essential in this case. It is sufficient for the detection radiation to be incident on the detector. Thus, the objective comprises a highly corrected illumination beam path for illumination of the object while at the same time having a great working distance, and due to the partial detection beam path, the objective may gather detection radiation from a solid angle range greater than that used for illumination, so that the gathering efficiency of the objective is increased. Thus, the microscope objective system according to the invention comprises an objective with an aperture acting in a divided manner, with the core aperture preferably having a circular shape and the ring aperture preferably having an annular ring shape.

In particular, the imaging properties of the illumination beam path may be better than the imaging properties of the partial detection beam path. This is possible because in many cases all that matters is to guide the detecting radiation towards the detector. Good and error-free imaging is then not required. It suffices if the radiation to be detected, which passes into the partial detection beam path, reaches the detector anyway.

In particular, the partial detection beam path is provided such that radiation to be detected and entering the partial detection beam path is guided towards the detector via the illumination beam path. Mixing of the radiation to be detected which enters the illumination beam path and which enters the partial detection beam path takes place.

In particular, the partial detection beam path may be provided such that it is shorter than the illumination beam path and, thus, only extends along part of the illumination beam path in the direction of the objective's optical axis. In this case, the partial detection beam path is preferably arranged at the front end (the end facing towards the sample) of the objective. It is also possible, of course, that the partial detection beam path extends along the illumination beam path over the entire length of the objective. In particular, the partial detection beam path may be provided such that it is completely separated from the illumination beam path.

In one embodiment of the microscope objective system according to the invention, the objective includes an optical element having a different optical property (in particular a different optical imaging property) in the area assigned to the partial detection beam path than in the area assigned to the illumination beam path. Thus, the division of the aperture can be realized with only one (e.g. additional) optical element. The optical element is preferably provided such that its optical property in the area correlating with the core aperture is neutral, if possible, with respect to the remaining elements of the objective so that re-fitting of the optical element into an already existing objective is possible.

Further, in the objective of the microscope objective system, the partial detection beam path and the illumination beam path may be arranged coaxially with respect to each other.

In the optical element, the outer region correlating with the ring aperture may be provided as a refractive region with positive refractive power. In addition, the inner region assigned to the core aperture may be provided as a plane-parallel plate. Such an optical element may be produced in a particularly easy manner, for example, by grinding the convex side of a plano-convex lens accordingly.

It is further possible to provide that region of the optical element which is assigned to the ring aperture as a stepped lens, in particular a Fresnel lens.

It is further possible to provide the outer region of the optical element assigned to the ring aperture as a diffractive region. Of course, it is also possible for the outer region to have refractive and diffractive properties.

The optical element may be arranged in the objective such that it is the last element of the objective preceding the object to be examined. In this region, the separation of the core and ring apertures is possible with particular ease without the two regions having an adverse influence on each other.

The microscope objective system further may comprise a detector and a beam splitter, arranged between the detector and the objective, for splitting the illumination radiation and the detection radiation, said beam splitter directing the detection radiation onto the detector. As the beam splitter, a wavelength-selective beam splitter may be used, for example. This is advantageous, in particular, when using the microscope objective system for fluorescence microscopy.

For instance, the detector is a surface detector. Such a detector is used, in particular, if the microscope objective system is used in a laser scanning microscope.

The objective of the microscope objective system may comprise an optical front element (i.e. that element, whose distance from the sample is the smallest when using the microscope objective system in a microscope), which is arranged, for example, such that it is not displaceable in the direction of the optical axis; a plurality of optical elements spaced apart from the front element and from each other, which are displaceable along the optical axis; as well as an adjusting unit by which the optical elements are displaceable along the optical axis such that at least one distance between two adjacent elements is modifiable. This may be effected such, in particular, that only said one distance between two adjacent elements is modified.

Such modification of the distance may be used, for example, in order to compensate for a temperature-induced imaging error of the objective, if the modification of the distance is effected as a function of temperature. Thus, an objective may be provided which is corrected for a temperature range of 20, 30 or more ° C.

This temperature compensation is preferably effected by open-loop or closed-loop control, in which case a temperature sensor is also provided which continuously determines the actual temperature of the objective and transmits it to the adjusting unit which adjusts the distance(s) as a function of the determined temperature.

In particular, the modification of the distance between two adjacent elements, when the microscope objective system is employed in an immersion microscope, may be utilized in order to compensate, for example, for variations in thickness of the immersion medium, thermally induced variations in the refractive index of the immersion medium and/or a modification of the type of immersion medium. By modifying the distance, the aperture error caused thereby is compensated for.

In particular, the modification of two different distances between adjacent elements, said distances preferably being independently modified, may be utilized so as to modify the position of the focus without having to modify the working distance between the objective and the sample to be examined. There is practically a sort of internal focusing, wherein neither the objective as a whole nor the specimen stage has to be moved in the direction of the objective's optical axis. In particular when using the microscope objective system in a microscope (for example, a laser scanning microscope), this has the effect that optical sections can be effected at different depths of the sample without having to move the sample along the optical axis or the entire objective. This is advantageously achieved in that, during modification of the focal position, the working distance (working distance meaning the distance between the front element and the sample surface here) may remain constant, so that no force is transmitted from the immersion medium to the sample by the modification of the focal position, and vibrations which may occur, for example, in conventional focusing are avoided. Further, it is no longer required to move the entire objective so that a smaller mass to be moved is present.

Also, the modification of a distance between adjacent elements so as to compensate for a temperature-induced imaging error may be effected such that the working distance remains constant.

In particular, exactly two distances between elements of the objective are modified by means of the adjusting unit.

The use of the microscope objective system (or one of its embodiments) according to the invention in a microscope, in particular in a fluorescence microscope or a 2-photon microscope, is particularly preferred. A microscope is then provided which, due to the microscope objective system, has an extremely high light gathering efficiency and at the same time a very great working distance between the objective and the object to be examined. In particular, the microscope may be provided as an immersion microscope. The microscope objective system is suitable for any microscope, including a laser scanning microscope.

Further, a microscoping method is provided wherein radiation from a source is irradiated, via an objective, onto a sample to be examined, and radiation to be detected and coming from the sample is guided to a detector via the objective, using a smaller etendue for irradiation than for detection.

In particular, the objective uses a smaller solid angle range for irradiation than for detection. In the microscopy method, the sample can be irradiated with pulsed laser radiation. Further, 2-photon excitation can be detected.

In particular, the above-described microscope objective system and its further embodiments may be used in the microscopy method.

BRIEF DESCRIPTION OF THE DRAWINGS

The invention will be explained in more detail below, by way of example and with reference to the drawings, wherein.

DETAILED DESCRIPTION OF THE INVENTION

Figures 1, 2:
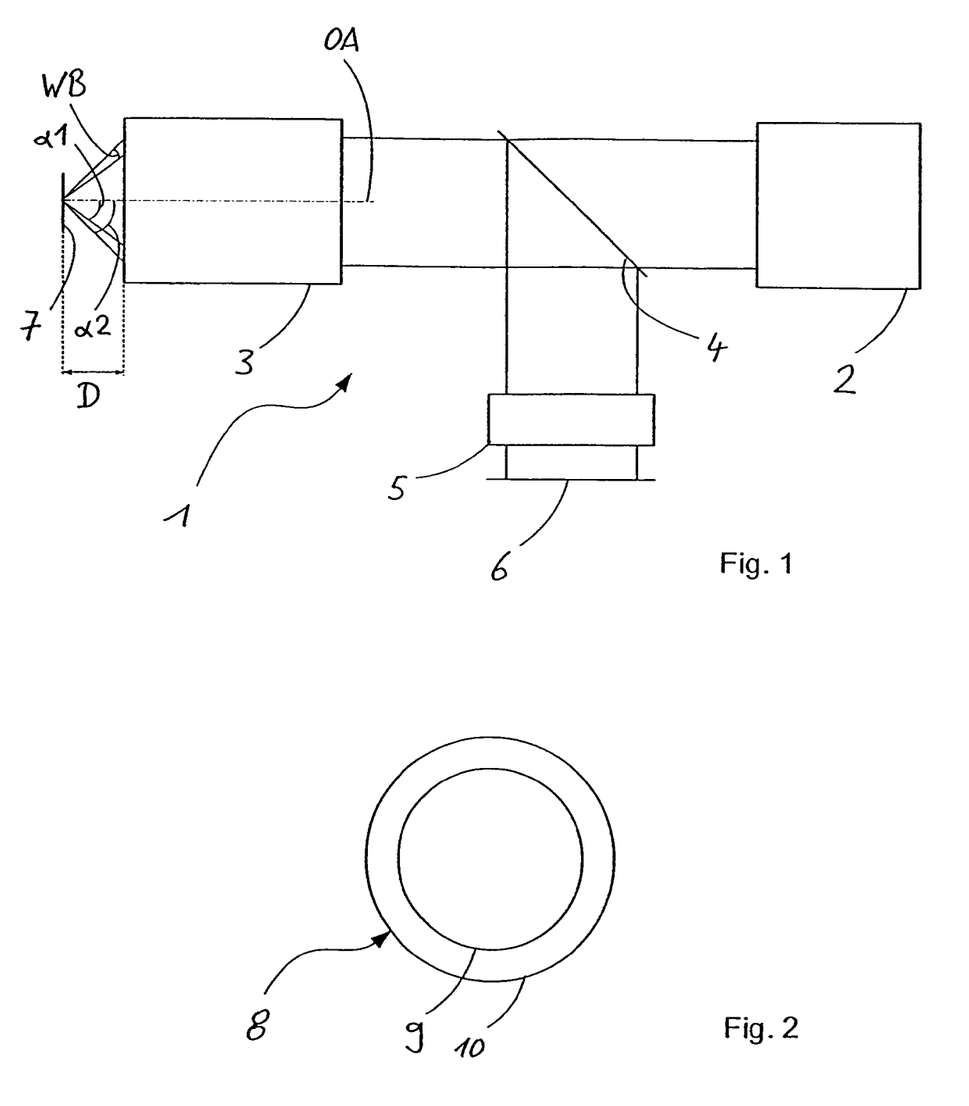
FIG. 1 shows a schematic view of an embodiment of the microscope according to the invention.
FIG. 2 shows a top view of an optical element of the objective of the microscope shown in FIG. 1.

The microscope schematically shown in FIG. 1 comprises a microscope objective system 1 and a source of illumination 2 which, in this case, can emit electromagnetic radiation at a wavelength of from 700-1100 nm.

The microscope objective system 1 comprises an objective 3, a color splitter 4, detector optics 5 as well as a surface detector 6 which has a circular detection area with a diameter of approximately 10 mm. The color splitter 4 is adapted to transmit the electromagnetic radiation from the source 2 and to reflect radiation to be detected and coming from the object or from the sample 7, respectively, and lying in a wavelength range of from 400-700 nm.

The objective 3 is designed such that a smaller solid angle range ($\alpha 1$) is used for illumination of an object 7 than for detection ($\alpha 2$). The numeric aperture of the objective 3 is thus divided into a core aperture (corresponding to the angle $\alpha 1$) and a ring aperture corresponding to the angular range WB (WB includes angles which are greater than $\alpha 1$ and smaller than or equal to $\alpha 2$). In the microscope objective system described herein, the objective is an immersion objective using water as the immersion liquid. The working distance D between the objective 3 and the sample 7 is 2.11 mm here, the core aperture is 0.8 and the outer ring aperture is within the range of from 0.8 to 1.15.

The objective 3 is provided with high optical correction only with respect to electromagnetic radiation from the source 2 for the illumination beam path (in the objective 3) assigned to the core aperture. In this case, the correction is selected such that one can speak of diffraction-limited imaging.

In the partial detection beam path of the objective 3 assigned to the ring aperture, the objective 3 is optically corrected, if at all, considerably more poorly for the electromagnetic radiation from the source 2. However, since this region is not used for illumination, this does not lead to any disadvantages in illumination or excitation, respectively, of the sample 7 to be examined.

The partial detection beam path is substantially designed such that fluorescence radiation from the sample coming from the correspondingly associated solid angle range WB securely arrives at the detector 6. This does not require good-quality imaging, because the location where the detected radiation impinges on the detection area of the surface detector 6 is not evaluated. It is essential only that the detected radiation passing into the partial detection beam path impinges on the detection area of the surface detector anyway. However, the radiation to be detected and passing into the illumination beam path is also guided to the detector. Thus, the partial detection beam path and the illumination beam path form a detection beam path to which both the core aperture and the ring aperture are assigned.

In order to realize this, the objective 3 includes an optical element 8 (FIG. 2) which comprises an annular ring-shaped inner region 9 and an annular ring-shaped outer region 10 enclosing it. The inner region 9 correlates with the core aperture and the outer region 10 correlates with the outer ring aperture. In the example described here, the inner region 9 is provided as a plane-parallel plate with a thickness of 2.14 mm, and the outer region 10 is provided as a planoconvex lens. Using this optical element 10, the division of the aperture of the objective 3 into the core aperture and the ring aperture is effected.

In other words, the etendue of the illumination beam path (i.e. core aperture times illuminated surface area of the sample in the focus) is smaller than the etendue of the detection beam path (i.e. (core aperture+ring aperture) times the area to be detected which corresponds to the illuminated area of the sample in the focus).

Figure 3:
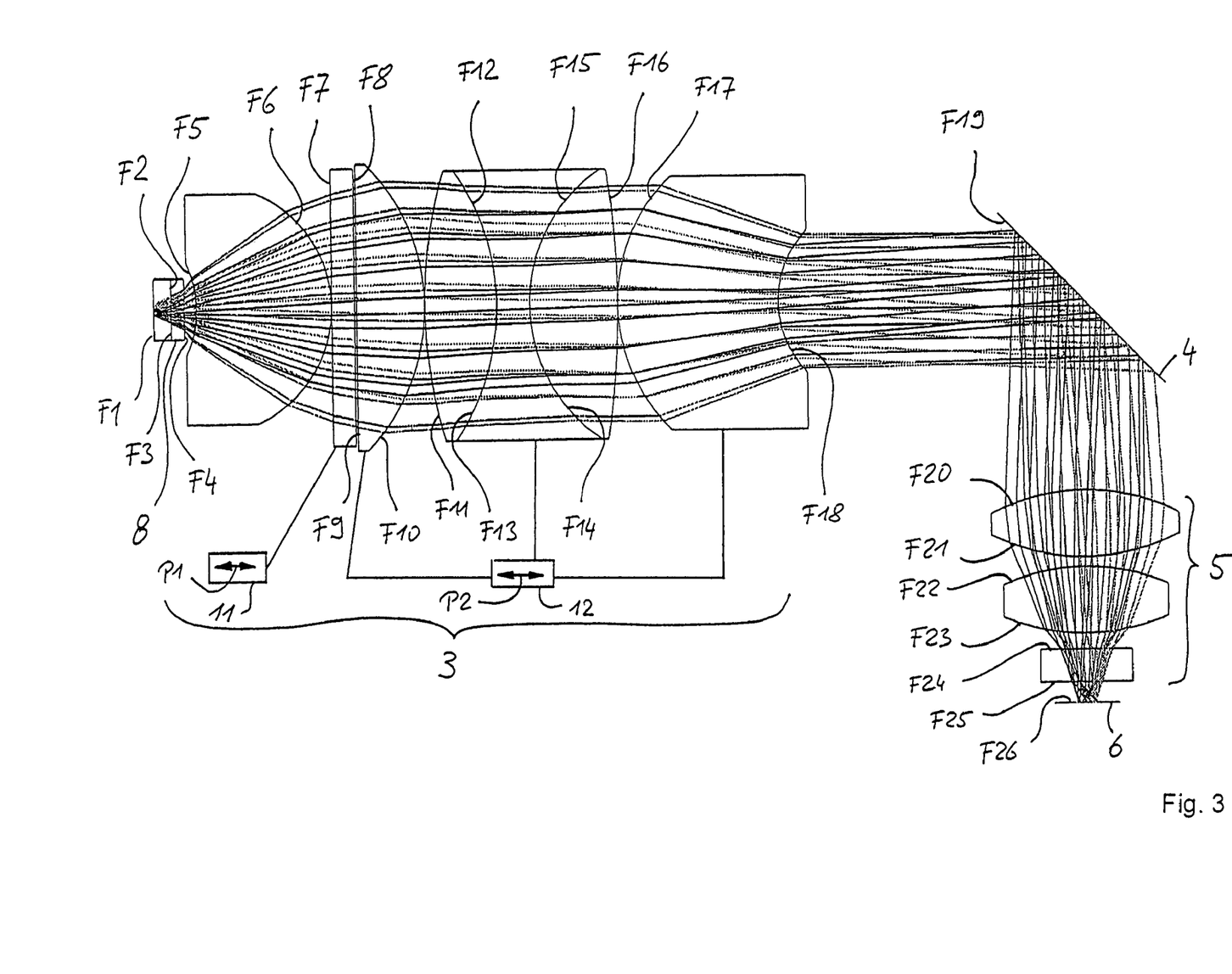
FIG. 3 shows a lens section of the microscope objective system of FIG. 1, illustrating the optical ray path of the objective's core aperture.

The lens section of FIG. 3 shows the beam path for the detection radiation gathered within the core aperture and directed onto the detector 6. From the color splitter 4 up to the sample 7, this beam path also corresponds to the illumination beam path for the light from the source 2.

Figure 4:
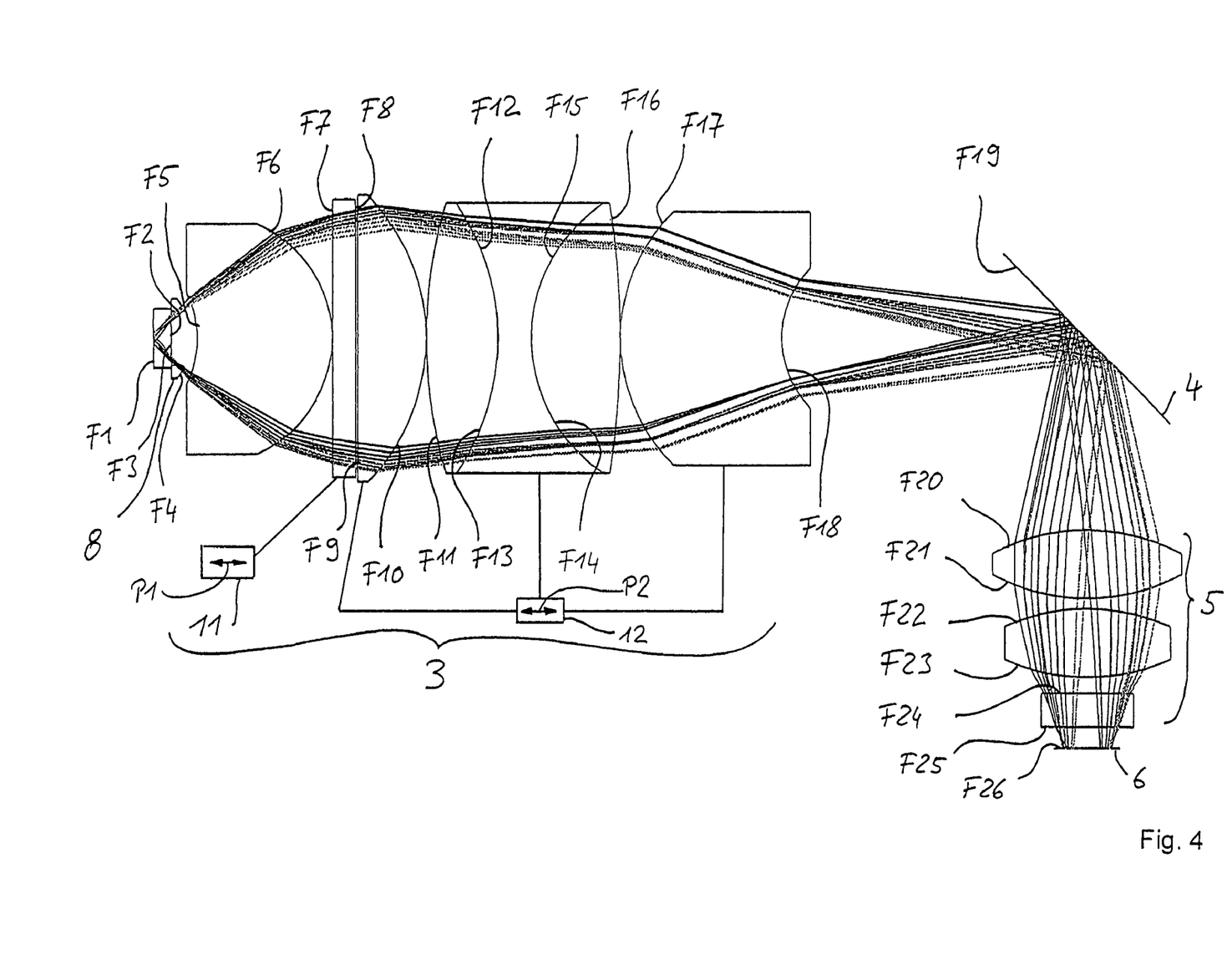
FIG. 4 shows a lens section of the microscope objective system of FIG. 1, illustrating the optical ray path for the ring aperture of the objective.

FIG. 4 shows the beam path for detection radiation gathered via the ring aperture region. Thus, this radiation is the additionally gathered radiation which leads to an increased gathering efficiency. As is evident from FIG. 4 in comparison with FIG. 3, the radiation gathered via the ring aperture extends increasingly within the illumination beam path as the distance from the surface F4 increases towards the right in FIG. 4. Thus, the detection beam path passes into the illumination beam path and mixing of the detection radiation gathered via the core aperture and the ring aperture occurs. Therefore, the microscope objective system according to the invention is suitable, in particular, for 2-photon or even multi-photon microscopy. FIG. 3 only shows the inner region 9 of the optical element 8 and FIG. 4 only shows the outer region thereof.

The exact optical structure of an example objective 3 is indicated in the following Tables:

TABLE 1

| Surface—Surface | Distance [mm] | Material |
|---|---|---|
| F1-F2 | 2.11 | Water |
| F2-F3 | 0 | Water |
| F3-F4 | 2.14 | N-SK2 |
| F4-F5 | 0.90 | Gas (e.g. air) |
| F5-F6 | 15.99 | N-LASF31 |
| F6-F7 | 0.05 | Gas (e.g. air) |
| F7-F8 | 2.70 | Suprasil |
| F8-F9 | 0.24 | Gas (e.g. air) |
| F9-F10 | 8.08 | N-PSK3 |
| F10-F11 | 0.05 | Gas (e.g. air) |
| F11-F12 | 8.58 | N-FK5 |
| F12-F13 | 0 | Cement |
| F13-F14 | 4.00 | SF5 |
| F14-F15 | 0 | Cement |
| F15-F16 | 10.75 | N-BaLF5 |
| F16-F17 | 0.05 | Gas (e.g. air) |
| F17-F18 | 19.93 | N-LAK8 |
| F18-F19 | 37.42 | Gas (e.g. air) |
| F19-F20 | 23.00 | Gas (e.g. air) |

TABLE 1-continued

| Surface—Surface | Distance [mm] | Material |
|---|---|---|
| F20-F21 | 8.00 | N-BK7 |
| F21-F22 | 1.20 | Gas (e.g. air) |
| F22-F23 | 8.00 | N-BK7 |
| F23-F24 | 2.00 | Gas (e.g. air) |
| F24-F25 | 4.00 | Filter |
| F25-F26 | 2.50 | Gas (e.g. air) |

TABLE 2

| Surface | Radius of curvature [mm] | Surface type |
|---|---|---|
| F1 | infinite | planar surface |
| F2 | infinite | planar surface |
| F3 | infinite | planar surface |
| F4 | 8.7856 | convex surface |
| F5 | 13.146 | concave surface |
| F6 | 15.181 | convex surface |
| F7 | infinite | planar surface |
| F8 | infinite | planar surface |
| F9 | infinite | planar surface |
| F10 | 24.938 | convex surface |
| F11 | 57.051 | convex surface |
| F12 | 28.800 | convex surface |
| F13 | 28.800 | concave surface |
| F14 | 19.387 | concave surface |
| F15 | 19.387 | convex surface |
| F16 | 105.934 | convex surface |
| F17 | 20.834 | convex surface |
| F18 | 11.884 | concave surface |
| F19 | infinite | planar surface |
| F20 | 25.851 | convex surface |
| F21 | 25.851 | convex surface |
| F22 | 25.851 | convex surface |
| F23 | 25.851 | convex surface |
| F24 | infinite | planar surface |
| F25 | infinite | planar surface |
| F26 | infinite | planar surface |

Of course, the optical element 8 is provided as a planoconvex lens only in the region of the outer ring aperture. Thus, the radius of curvature of the surface F4 is indicated only for the outer region 10. In the region of the core aperture (inner region 9) with a diameter of 6.6 mm, the optical element 8 is provided as a plane-parallel plate, so that in the core region 9 the surface F4 has an infinite radius of curvature.

The surfaces F12+F13 as well as F14+F15 are respectively cemented to each other. The element with the surfaces F 24 and F25 is an emission filter.

The surface F7 is provided as a diffractive surface which can be described by the following phase polynomial P(r)

$$P(r) := \sum_{i=1}^{5} a_i \cdot r^{2 \cdot i}$$

wherein $a1=2.7630329\times10^{-4}$; $a2=-3.440241\times10^{-7}$; $a3=1.1453504\times10^{-9}$; $a4=-1.937287\times10^{-12}$; $a5=-3.479758\times10^{-17}$, and r is the radial distance. The phase polynomial P(r) indicates the phase shift as a function of the radial distance r, and the grating frequency of the diffractive element can be calculated from the derivation of the phase polynomial according to the radial distance r.

FIGS. 3 and 4 further schematically show two adjusting elements 11 and 12, which together form an adjusting unit. As indicated by the double arrow P1, the adjusting element 11 allows the element with the surfaces F7 and F8 to be moved along the optical axis of the objective 3. Likewise, the group of optical elements with the surfaces F9-F18 can be moved together in the direction of the optical axis of the objective 3 by means of the adjusting element 12 as indicated by the double arrow P2. This makes it possible to independently adjust the distance between the surfaces F6 and F7 and the distance between the surfaces F8 and F9 by means of the adjusting elements 11 and 12. This may be utilized in order to modify the focal position along the optical axis without modifying the working distance D, so that optical sections can be effected at different depths of the sample. Since the working distance D need not be changed for this purpose, this does not lead to otherwise disadvantageously appearing vibrations and transmissions of force onto the sample via the immersion liquid, which would occur during conventional focusing due to movement of a specimen stage and/or of the objective and, thus, due to modification of the working distance.

In another aspect of the invention, the objective 3 has a somewhat different structure than the objective 3 described so far. The structure of the detector optics 5 remains unchanged. The modified objective structure is evident from the following Tables 3 and 4:

TABLE 3

| Surface—Surface | Distance [mm] | Material |
|---|---|---|
| F1-F2 | 2.0 | Water |
| F2-F3 | 0.00 | |
| F3-F4 | 0.80 | Suprasil |
| F4-F5 | 0.98 | Gas (e.g. air) |
| F5-F6 | 17.37 | N-LASF31 |
| F6-F7 | 0.36 | Gas (e.g. air) |
| F7-F8 | 2.50 | Suprasil |
| F8-F9 | 0.99 | Gas (e.g. air) |
| F9-F10 | 6.86 | PSK3 |
| F10-F11 | 0.05 | Gas (e.g. air) |
| F11-F12 | 9.47 | FK5 |
| F12-F13 | 0.00 | Cement |
| F13-F14 | 4.00 | SF5 |
| F14-F15 | 0.00 | Cement |
| F15-F16 | 8.36 | N-BaLF5 |
| F16-F17 | 0.05 | Gas (e.g. air) |
| F17-F18 | 17.46 | N-LAK8 |

TABLE 4

| Surface | Radius [mm] | Surface type |
|---|---|---|
| F1 | Infinite | planar surface |
| F2 | infinite | planar surface |
| F3 | infinit3 | planar surface |
| F4 | 8.79 | convex surface |
| F5 | −14.236 | concave surface |
| F6 | −14.495 | convex surface |
| F7 | infinite | planar surface |
| F8 | infinite | planar surface |
| F9 | infinite | planar surface |
| F10 | −26.120 | convex surface |
| F11 | 42.398 | convex surface |
| F12 | −24.357 | convex surface |
| F13 | −24.357 | concave surface |
| F14 | 18.042 | concave surface |
| F15 | 18.042 | convex surface |
| F16 | −312.963 | convex surface |
| F17 | 19.022 | convex surface |
| F18 | 11.170 | concave surface |

The coefficients of the diffractive surface F7 for the above phase polynomial P(r) are as follows:

$a1=2.6647\times10^{-4}$; $a2=3.985\times10^{-7}$; $a3=1.3929\times10^{-9}$; $a4=-3.1751\times10^{-13}$; $a5=-3.7438\times10^{-17}$.

The necessary modification of the distances between the surfaces F6 and F7 as well as between the surfaces F8 and F9 for a defocusing range of +/−0.1 mm is indicated in the following Table 5.

TABLE 5

| Defocusing [mm] | Modification of Distance F6-F7 [mm] | Modification of Distance F8-F9 [mm] |
|---|---|---|
| −0.1 | −0.16 | 0.85 |
| −0.08 | −0.12 | 0.68 |
| −0.06 | −0.09 | 0.51 |
| −0.04 | −0.06 | 0.34 |
| −0.02 | −0.03 | 0.17 |
| 0.0 | 0.0 | 0.0 |
| 0.02 | 0.03 | −0.17 |
| 0.04 | 0.06 | −0.34 |
| 0.06 | 0.09 | −0.51 |
| 0.08 | 0.12 | −0.68 |
| 0.10 | 0.15 | −0.85 |

It is further possible to achieve temperature compensation of imaging errors within a temperature range of, for example, from 20 to 40° C. by modifying the distances F6-F7 as well as F8-F9. If the objective 3 is designed for a temperature of 20° C., it is required, at an operating temperature of 30° C., to modify the distance F6-F7 by -0.0324 mm and the distance F8-F9 by 0.0109 mm. At a temperature of 40° C., the modification of the distance F6-F7 is −0.0658 mm and the modification of the distance F8-F9 is 0.0231 mm.

As adjusting elements 11 and 12, piezo-adjusting elements or other adjusting elements having the desired precision for displacement of the elements can be used, for example.

In particular, a temperature sensor (not shown) can also be provided, which constantly measures the temperature of the objective 3 and transmits it to a control unit (not shown). As a function of the measured temperature, the control unit then controls the adjusting elements 11 and 12. Of course, such control unit may also be used to modify the focal position in the above-described manner.

In the microscope shown in FIG. 1, e.g. a deflecting means may also be arranged between the objective 3 and the color splitter 4, so that the microscope is then provided as a laser scanning microscope. The detector optics 5 may also be omitted.

The invention claimed is:

1. A microscope objective system comprising:
an objective, comprising a first optical element defining an illumination beam path via which illumination radiation from a source is directed onto a sample to be examined; and
a second optical element surrounding at least part of the first optical element and defining a partial detection beam path and, which together with the first optical element, defines a detection beam path via which radiation to be detected and coming from the sample is guided towards a detector;
wherein the first optical element comprises a core aperture, and the second optical element comprises a ring aperture surrounding the core aperture.

2. The microscope objective system as claimed in claim 1, wherein the partial detection beam path begins at an end of the objective facing towards the sample.

3. The microscope objective system as claimed in claim 1, wherein the illumination beam path has a first etendue and the detection beam path has a second etendue which is greater than the first etendue.

4. The microscope objective system as claimed in claim 1, wherein the imaging properties of the first optical element are better than the imaging properties of the second optical element.

5. The microscope objective system as claimed in claim 1, wherein the first optical element has a different optical imaging property than the second optical element.

6. The microscope objective system as claimed in claim 1 wherein the second optical element comprises a refractive region having positive refractive power.

7. The microscope objective system as claimed in claim 1, wherein the first optical element is arranged within the objective such that it is nearest the sample to be examined.

8. The microscope objective system as claimed in claim 1, wherein the partial detection beam path and the illumination beam path are arranged coaxially with respect to each other.

9. The microscope objective system as claimed in claim 1, wherein the detection beam path extends along the illumination beam path whereby detection radiation gathered by the first optical element and detection radiation gathered by the second optical element is mixed.

10. The microscope objective system as claimed in claim 1, further comprising a detector and a beam splitter arranged between the detector and the objective, said beam splitter directing the radiation to be detected onto the detector.

11. The microscope objective system as claimed in claim 1, wherein the objective comprises a front optical element, a plurality of additional optical elements spaced apart from the front element and from each other, and an adjusting unit by which at least one of the additional optical elements is displaceable along the optical axis such that at least one distance between two adjacent additional optical elements is modifiable.

12. The microscope objective system as claimed in claim 11, wherein the at least one distance is modified by the adjusting unit to displace the focal position of the objective relative to the front element in the direction of the optical axis.

13. The microscope objective system as claimed in claim 11, wherein the at least one distance is modified by the adjusting unit as a function of the temperature of the objective to compensate for a temperature-induced imaging error of the objective.

14. The microscope objective system as claimed in claim 11, wherein two distances are independently modified by the adjusting unit.

15. A microscope objective system comprising:
an objective, comprising a first optical element defining an illumination beam path via which illumination radiation from a source is directed onto a sample to be examined; and a second optical element surrounding at least part of the first optical element and defining a partial detection beam path and, which together with the first optical element, defines a detection beam path via which radiation to be detected and coming from the sample is guided towards a detector;
wherein the first optical element has a different optical imaging property than the second optical element; and
further wherein the first optical element has a substantially circular shape and the second optical element has a substantially annular ring shape.

16. A microscope objective system comprising:
an objective, comprising a first optical element defining an illumination beam path via which illumination radiation from a source is directed onto a sample to be examined; and
a second optical element surrounding at least part of the first optical element and defining a partial detection beam path and, which together with the first optical element, defines a detection beam path via which radiation to be detected and coming from the sample is guided towards a detector;

wherein the first optical element has a different optical imaging property than the second optical element; and further wherein the second optical element comprises a Fresnel lens.

17. A microscope objective system comprising:

an objective, comprising a first optical element defining an illumination beam path via which illumination radiation from a source is directed onto a sample to be examined; and a second optical element surrounding at least part of the first optical element and defining a partial detection beam path and, which together with the first optical element, defines a detection beam path via which radiation to be detected and coming from the sample is guided towards a detector;

wherein the first optical element has a different optical imaging property than the second optical element; and further wherein the second optical element comprises a diffractive region.

18. A microscope objective system comprising:

an objective, comprising a first optical element defining an illumination beam path via which illumination radiation from a source is directed onto a sample to be examined; and a second optical element surrounding at least part of the first optical element and defining a partial detection beam path and, which together with the first optical element, defines a detection beam path via which radiation to be detected and coming from the sample is guided towards a detector;

wherein the first optical element has a different optical imaging property than the second optical element; and further wherein the second optical element comprises a ring lens.

19. A microscope objective system comprising:

an objective, comprising a first optical element defining an illumination beam path via which illumination radiation from a source is directed onto a sample to be examined; and a second optical element surrounding at least part of the first optical element and defining a partial detection beam path and, which together with the first optical element defines a detection beam path via which radiation to be detected and coming from the sample is guided towards a detector;

wherein the first optical element has a different optical imaging property than the second optical element; and further wherein the first optical element comprises a substantially plane-parallel plate.

* * * * *

UNITED STATES PATENT AND TRADEMARK OFFICE
CERTIFICATE OF CORRECTION

PATENT NO. : 7,561,338 B2 Page 1 of 1
APPLICATION NO. : 11/459146
DATED : July 14, 2009
INVENTOR(S) : Ralf Wolleschensky, Hans-Jürgen Dobschal and Robert Brunner It is certified that error appears in the above-identified patent and that said Letters Patent is hereby corrected as shown below:

On the title page item [75] 2nd inventor should read
-- (75) Hans-Jürgen Dobschal, Kleinromsted[[l]]t, (DE) --.

Signed and Sealed this

Eleventh Day of May, 2010

David J. Kappos
*Director of the United States Patent and Trademark Office*